United States Patent
Okamoto et al.

(10) Patent No.: US 6,420,167 B1
(45) Date of Patent: Jul. 16, 2002

(54) FERMENTATION TREATMENT APPARATUS OF ORGANIC WASTE

(75) Inventors: Masakatsu Okamoto, Kakogawa; Kazuo Hayashi, Kobe; Noriaki Tsuchiiwa, Akashi; Yasuo Hayami, Fukuoka, all of (JP)

(73) Assignee: TLV Co. Ltd., Hygo (JP)

( * ) Notice: Subject to any disclaimer, the term of this patent is extended or adjusted under 35 U.S.C. 154(b) by 0 days.

(21) Appl. No.: 09/403,634

(22) PCT Filed: Feb. 18, 1999

(86) PCT No.: PCT/JP99/00711
§ 371 (c)(1),
(2), (4) Date: Jan. 24, 2000

(87) PCT Pub. No.: WO99/42229
PCT Pub. Date: Aug. 26, 1999

(30) Foreign Application Priority Data

| Feb. 23, 1998 | (JP) | 10-058876 |
| Mar. 13, 1998 | (JP) | 10-082816 |
| Apr. 28, 1998 | (JP) | 10-119313 |
| Jul. 15, 1998 | (JP) | 10-199929 |
| Dec. 15, 1998 | (JP) | 10-355545 |

(51) Int. Cl.$^7$ ............................................... C12M 1/36
(52) U.S. Cl. .................. 435/286.6; 435/290.1
(58) Field of Search ................... 435/290.1–290.4, 435/286.1, 286.6; 71/8; 99/276, 278; 426/7

(56) References Cited

U.S. PATENT DOCUMENTS 5,534,437 A * 7/1996 Arrau ...................... 435/290.3

FOREIGN PATENT DOCUMENTS

| JP | Sho-57/14920 | 3/1982 |
| JP | Hei-06/41601 | 1/1994 |
| JP | Hei-7-68239 | 3/1995 |
| JP | Hei-08/10742 | 1/1996 |
| JP | Y2-2517216 | 8/1996 |
| JP | Hei-9-47747 | 2/1997 |
| JP | Hei-9-77581 | 3/1997 |
| JP | Hei-9-165283 | 6/1997 |
| JP | Hei-10/1382 | 1/1998 |
| JP | Hei-10/139574 | 5/1998 |

OTHER PUBLICATIONS

International Search Report for PCT/JP99/00711 (PCT/ISA/210–second sheet and continuation of second sheet.

* cited by examiner

*Primary Examiner*—David A. Redding
(74) *Attorney, Agent, or Firm*—Faegre & Benson LLP

(57) ABSTRACT

To make organic fertilizer by performing fermentation treatment of organic waste containing a large quantity of water content such as garbage, while maintaining conditions of treatment suitable for fermentation.

A fermentation treatment apparatus of organic waste according to the present invention is constituted in such a way that a steam supply pipe 3 is connected to a jacket part 2 of a fermentation tank 1 by way of reducing valves 17 and 18, and a vacuum pump 4 is connected below the jacket part 2 by way of a communicating line 27. When steam reduced in pressure lower than 100° C. is supplied into the jacket part 2, the waste housed within the fermentation tank 1 can be promptly treated with fermentation by utilizing condensation heat of steam. Furthermore, the air at a predetermined humidity is supplied into the fermentation tank 1 from the air supply part 36, so that fermentation treatment due to aerobic bacteria can be performed in a short time and efficiently.

7 Claims, 4 Drawing Sheets

FERMENTATION TREATMENT APPARATUS OF ORGANIC WASTE

TECHNICAL FIELD

This invention relates to an apparatus for performing fermentation treatment of organic waste containing water content such as garbage or the like to make organic fertilizer or the like. Particularly, it relates to an apparatus for performing fermentation treatment which allows the conditions of fermentation treatment such as temperature of the waste or percentage of water content of the waste to be maintained most suitably, so that fermentation treatment can be performed in a short time and efficiently.

BACKGROUND ART

Various kind of treatment machines for performing fermentation treatment of organic waste to make fertilizer for recycling are developed and. used, said organic waste, for example, including garbage which arises from homes, restaurants, super markets or the like, excrete and garbage which arises from fishery markets, fruit and vegetable markets, poultry farming places or pig farming places, or garbage which arises from food processing industry.

Such fermentation treatment apparatus of waste is disclosed in, for example, Patent Laid-open Gazette Hei-7-68239, Patent Laid-open Gazette Hei-9-47747, Patent Laid-open Gazette Hei-9-77581, and Patent Laid-open Gazette Hei-9-165283. These disclosed apparatuses use hot water or electric heaters as heating means for making temperature and percentage of water content suitable for fermentation treatment of waste. Further, in order to ascertain that humidity within the fermentation tank is a value suitable for fermentation treatment, a humidity sensor is attached within the fermentation tank to control the humidity within the fermentation tank.

Since these fermentation treatment apparatuses in the prior art use hot water or electric heaters as heating means, there is a disadvantage in that it is impossible to heat the whole waste suitably and to treat it efficiently with fermentation, particularly, in the case where a large quantity of waste is treated, there is a disadvantage in that it is difficult to maintain said waste within a range of temperature suitable for fermentation, so a long time is required to perform good fermentation. That is to say, even when the waste is heated using hot water or an electric heater in a circulating way or in a continuous way, in the case of hot water, although such hot water itself can be used within a range of temperature suitable for fermentation or at a temperature near thereto, with hot water at such a temperature, it is difficult to give a large quantity of heat to said waste in order to make the waste to a temperature suitable for fermentation. Furthermore, in the case of electric heaters, the waste is heated to a temperature rather higher than a temperature in a range suitable for fermentation, so irregularity of heating is caused and good fermentation cannot be performed.

Moreover, it is necessary for efficient fermentation treatment to change and regulate the driving conditions according to variation of the quantity and composition of the waste as the occasion demands, however, in the conventional fermentation treatment apparatus, it is difficult to control promptly and accurately the humidity within the fermentation tank which is one of the above-described driving conditions. For example, in the apparatus disclosed in Patent Laid-open Gazette Hei-9-77581, after the state of humidity within the fermentation tank is detected, i.e., after a change in the humidity within the fermentation tank is detected, feedback is performed and ON-OFF operation of a ventilation fan is made to exhaust the air within the fermentation tank or to supply fresh air into the fermentation tank. As a result, a time lag occurs to change the humidity within the fermentation tank to a predetermined value, so, the state of humidity cannot be maintained accurately.

The present invention aims at maintaining the conditions of fermentation treatment such as temperature and humidity of the waste most suitably, so that fermentation treatment of waste can be performed quickly and efficiently.

DISCLOSURE OF INVENTION

A fermentation treatment apparatus of organic waste according to the present invention, which comprises a fermentation tank for housing organic waste, and a means for maintaining the waste within said fermentation tank in the conditions suitable for fermentation treatment, characterized in that as one of said maintaining means, gas which performs gas-liquid change within a range of temperature suitable for fermentation, particularly steam vapor reduced in pressure is used, whereby the waste is heated and maintained in such heated condition due to a change of said gas. It is widely known that a relation between pressure and temperature in steam pressure is determined clearly (saturated steam pressure curve). For example, in the case of steam vapor, it amounts to 100° C. at 760 mm Hg, approximately 80° C. at 360 mm Hg and approximately 40° C. at 60 mm Hg. Further, in the case of ethanol steam, approximately 80° C. at 760 mm Hg, and; approximately 40° C. at 130 mm Hg. In this way, pressure is changed to make die temperature of said gas to that within a range of temperature suitable for fermentation of said gas and large condensation heat generated at the time of vaporization of said gas is used for beating waste.

Steam vapor at reduced pressure can be supplied by reducing the steam at a relatively high pressure, for example, a steam pressure at 5 kg/cm$^2$ or 3 kg/cm$^2$ generated by a normal boiler or the like, to atmospheric pressure or so, or to a pressure lower than atmospheric pressure by way of a pressure regulating valve or a reducing valve or the like. Furthermore, by keeping the interior of the primary side heat treatment device or the interior of the jacket part at a state of a predetermined reduced pressure, or by connecting the interior of the primary side heat treatment device or the interior of the jacket part to a suction means such as a vacuum pump to keep a predetermined state of reduced pressure, the waste can be treated with heat using a desired reduced pressure steam, i.e., the steam at a temperature suitable for fermentation lower than 100° C. there are two cases, one being the case of treatment being performed in the air and the other being the case of treatment being performed in the ambient atmosphere of predetermined gas which is exhausted of air. Depending on the kind of fermentation bacteria used at the time of fermentation treatment, if the fermentation bacteria is aerobic, fermentation treatment is performed in the air ambient atmosphere, and if it is anaerobic, fermentation treatment is performed in the predetermined gas ambient atmosphere which is exhausted of air.

Preferably, said fermentation tank is provided at the primary side thereof with a heat treatment device, and use of steam vapor lower than an atmospheric pressure is possible as a heat source for maintaining said heat treatment device in a temperature suitable for heat treatment. In the case where fermentation treatment of organic waste such as excreta of domestic animals is performed, arranging the heat treatment device at the primary side of the fermentation tank and using the steam vapor at a reduced pressure as a heat source allows a process of fermentation treatment to be performed efficiently and in a short time, by heating the waste to a suitable temperature with a large quantity of heat generated at the time of liquefaction to adjust previously the percentage of water content of the waste to a value in a range suitable for fermentation treatment, or by performing preliminary fermentation to recover methane gas.

Preferably, an absorbing means is connected to a heat exchange part in which heat exchange is performed between said gas and waste.

Moreover, in an fermentation treatment apparatus comprising a fermentation tank for housing organic waste, and a means for maintaining the waste within said fermentation tank in a state suitable for fermentation treatment, as one of said maintaining means, a means for regulating the humidity of the air supplied to the waste to a value suitable for fermentation treatment is provided, whereby said regulating means is adapted to regulate the humidity of the air which flows through an air supply part provided for supply of air into the above-described fermentation tank. Also in such a case, the conditions of fermentation treatment can be improved and the action of fermentation bacteria is activated so that fermentation treatment of the waste can be performed promptly and efficiently.

Preferably, the above-described regulating means is a humidification fluid injecting means, and a humidity detecting means is attached to the fermentation tank side of said humidification fluid injecting means, to thereby control a quantity of injection of fluid from the humidification fluid injecting means depending on the detected value of said humidity detecting means.

Provision of the humidification fluid injecting means at the air supply part allows the humidification fluid, for example, steam or spray water or the like to be injected into the air supplied into the fermentation tank to thereby cause a change in the humidity of the air. Furthermore, attaching a temperature detecting means to the fermentation tank side of the humidification fluid injecting means allows the humidity of the air supplied to the fermentation tank to be detected and allows a quantity of injection of fluid from the humidification fluid injecting means to be controlled, so that the humidity of the air supplied to the fermentation tank can be maintained to a predetermined value. Since the humidity of air supplied to the fermentation tank can be made to a predetermined value previously, the humidity within the fermentation tank can be controlled precisely in a state suitable for performing fermentation treatment.

After the air before injection of steam or water is heated to, for example, 100° C. or so, steam or water is injected, and thereafter, heat exchange of said air is performed to thereby cool it to, for example, 60° C., whereby the humidity and, further, temperature of said supplied air can be controlled more precisely.

With regard to control of a quantity of injection of humidification fluid, the humidification fluid injecting means is provided with a valve means, which allows the opening degree thereof to be adjusted, and a quantity of injection of steam or a quantity of water can be controlled by adjustment of the opening degree of the valve means. Moreover, a plurality of spray nozzles are attached to the humidification fluid injecting means, and the above-described control may be performed by adjusting the opening degree of the nozzle or the number of the opened nozzles.

More preferably, the above-described air supply part is provided with a oxygen enrichment means. Such oxygen enrichment means makes the concentration of oxygen in the supplied air most suitable for fermentation bacteria to thereby realize efficient fermentation. The oxygen enrichment means may be constituted in such a way as to adsorb nitrogen in the air using zeolite as a adsorbing means, or may be provided with a oxygen enrichment membrane as a gas separating membrane, or a membrane of liquid crystal or the like utilizing selective permeation function may be used.

BEST MODE FOR CARRYING OUT THE INVENTION

Figure 1:
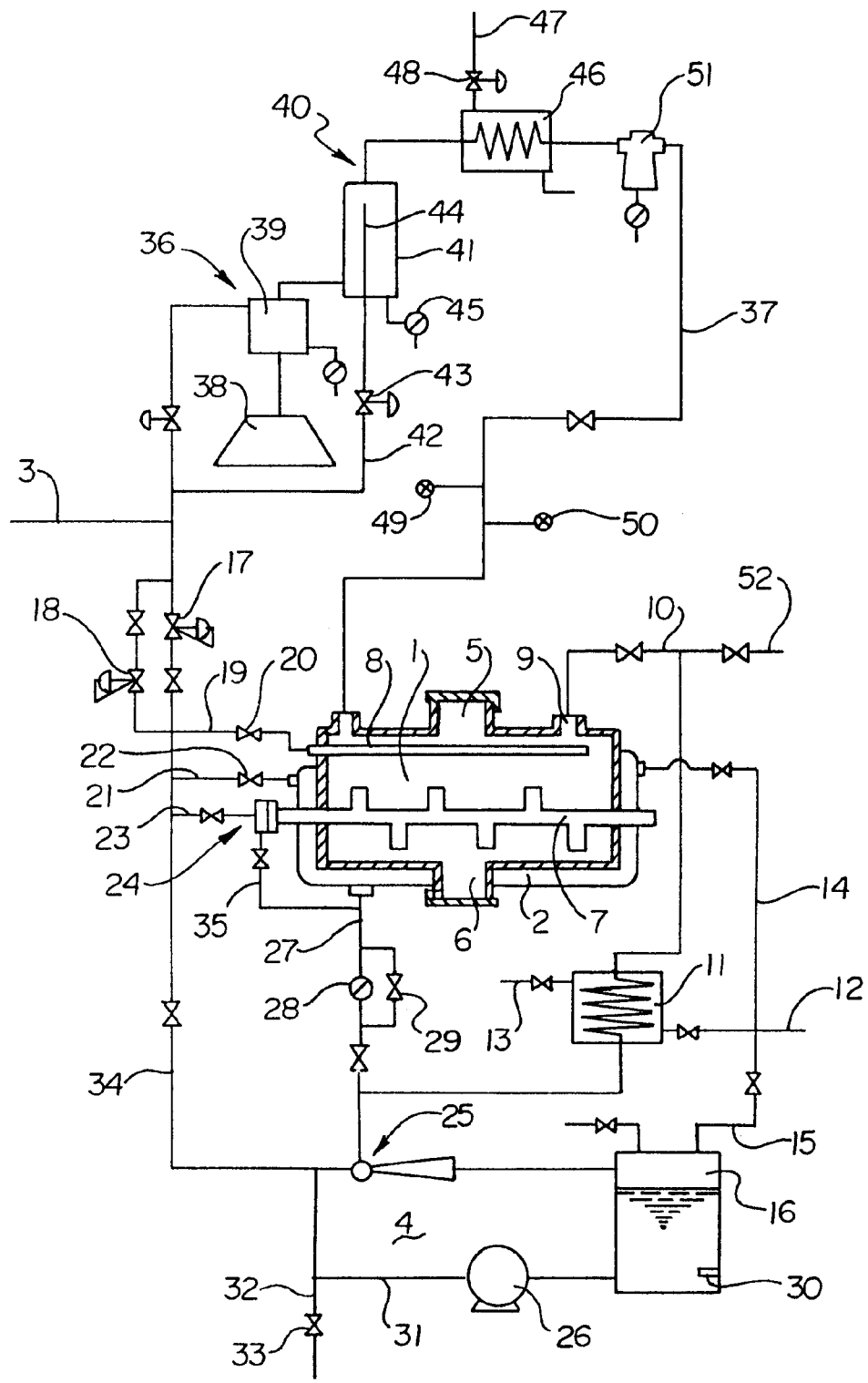
FIG. 1 is a partly sectional fragmentary view showing the constitution of a fermentation treatment apparatus for organic waste according to the present invention.

FIG. 1 shows the whole constitution of a fermentation treatment apparatus for organic waste according to the present invention.

Said fermentation treatment apparatus comprises a fermentation tank 1, and a jacket part 2 as a heat exchange part provided on the outer periphery of the fermentation tank 1, a steam supply pipe 3, a combination pump mechanism as a vacuum pump and an air supply part into the fermentation tank 1.

The fermentation tank 1 is constituted by a hollow body in the shape of a rectangular section, and is provided at the top with a casting inlet 5 for waste, and at the bottom with an outlet 6 for treated waste, and at the middle region with a rotatable agitating wing 7.

At the upper region within the fermentation tank 1 is provided with a water injecting pipe 8 for injecting the steam or circulating water into the waste housed in the fermentation tank 1 according to the percentage of water content of waste. Furthermore, on the upper part of the fermentation tank different from the casting inlet 5 is provided with a gas suction opening 9, which is connected to a lower combination pump mechanism 4 by way of a water content suction pipe 10. The water content suction pipe 10 branches and leads to a fermentation gas recovery pipe 52, and further, on the way to a combination pump mechanism 4, has an auxiliary heat exchanger 11 equipped with a cooling fluid supply pipe 12 and a discharge pipe 13. Interposition of said auxiliary heat exchanger 11 allows the evaporated steam flowing through the interior of the water content absorbing pipe 10 to be cooled and condensed.

The above-described cooling fluid supply pipe 12 is connected to the jacket part 2 by way of a pipe part 14 which branches on the way to the auxiliary heat exchanger 11 and, simultaneously, is connected by way of a pipe part 15 to a tank 16 which constitutes the combination pump mechanism 4.

The above-described steam supply pipe 3 is connected to a boiler (not shown), and supplies steam to the jacket part 2 to give a quantity of heat to the fermentation tank 1. The relatively high pressure steam supplied from the boiler is reduced to an atmospheric pressure or so, or to a pressure lower than that by way of a reducing valve 17, and is supplied to the jacket part 2 of the fermentation tank 1. Further, a second reducing valve 18 is provided in parallel with the reducing valve 17 and the set pressure of the second reducing valve 18 is made from above an atmospheric pressure to 2 or 3 $kg/cm^2$ or so, whereby the initial waste thrown into the fermentation tank 1 containing a large quantity of water content can be heated to a state of high temperature higher than 100° C. to thereby remove the initial excess water content in a short time. In the present embodiment, an example in which the reducing valves 17 and 18 are used is shown, however, an automatic regulating valve other than the reducing valve, for example, a pressure regulating valve or a temperature regulating valve can be used or, in the case where the steam pressure of a boiler is low and stable, a ball valve or a needle valve or the like may be used as a throttle valve.

In addition to the fact that the steam supply pipe 3 has a pipe part 21 and a valve 22 for supply of steam to the jacket part 2, as described above, the steam supply pipe 3 further branches on the way and leads to a water injecting pipe 8 by way of a pipe part 19 and a valve 20, and is connected to an agitating wing 7 by way of a pipe part 23 and a rotary joint 24. The interior of the agitating wing 7 is hollow so that the steam or circulating water supplied by way of the rotary joint 24 can flow therethrough.

A combination pump mechanism 4 as a vacuum pump comprises in combination an ejector 25, a tank 16 and a circulating pump 26. A circulating pump 26 delivers the water within the tank 16 into an ejector 25, and the ejector 25 causes a suction force corresponding to the temperature of said water to return it to the tank 16. To the top of the tank 16 is connected a cooling fluid supply pipe 12 by way of a pipe part 15, as already described, and when a temperature of water and a quantity of water within the tank 16 are detected by a temperature sensor 30 or a level sensor (not shown), as required, cooling fluid (cold water in the case of the present embodiment) from the supply pipe 12 or condensed water from the pipe part 14 is supplied to the tank 16 so that the temperature or quantity of water within the tank is controlled. The circulating line 31 of the combination pump mechanism 4 branches and leads to an excess fluid discharge pipe 32, to which a valve 33 which can be opened and closed according to the water level within the tank 16 is secured.

The circulating line 31 further branches and leads to a supply pipe 34, which is connected to the steam supply pipe 3. A portion of circulating water can be supplied to the interior of the agitating wing 7 and the jacket part 2 of the fermentation tank 1 or the water content injecting pipe 8 by way of said supply pipe 34. When the percentage of water content of the waste housed within the fermentation tank 1 becomes lower than a predetermined value due to some cause, such percentage of water content can be restored by supplying the temperature controlled circulating water within the tank 16 to the water content injecting pipe 8. Moreover, supplying the circulating water to the agitating wing 7 and the jacket part 2 allows the waste within the fermentation tank 1 after completion of fermentation treatment to be cooled.

The ejector 25 of the combination pump mechanism 4 is connected to the lower end of the jacket part 2 by way of a communicating line 27, to which a steam trap 28 and a valve 29 are secured in parallel. The steam trap 28 is a kind of automatic valve, which does not allow steam as a gas to flow and which allows water as liquid to flow to the outlet side automatically. Incidentally, the communicating line 27 further communicates a pipe part 35 between the lower end of the jacket part 2 and the steam trap 28 and connects the discharge part of the rotary joint 24.

The air supply part 36, which is connected to the steam supply pipe 3 before the reducing valves 17 and 18, is connected to an air supply pipe 37 which is connected to the top of the fermentation tank 1 at the downstream side in the direction of air flow. This air supply part 36 comprises an air fan 38 which supplies a desired quantity of air, and an aerofin heater 39 which heats the air fed from the air fan 38 to a predetermined temperature. The aerofin heater 39 introduces steam at a predetermined pressure or temperature from the steam supply pipe 3 and indirectly heats the air from the air fan 38 to a predetermined temperature.

A humidification fluid injecting means 40 is disposed at the downstream side of the aerofin heater 39. In the present embodiment, steam is used as humidification fluid. The humidification fluid injecting means 40 has a mixing part 41 having a sectional area larger than that of the air supply pipe 37. A steam pipe 42 which communicates with the steam supply pipe 3 extends into the mixing part 41 from below. The steam pipe 42 is provided with a regulating valve 43. A distal end pipe 44 within the mixing part 41 which continues from the steam pipe 42 is provided with a large number of steam blow-off holes. To the lower portion of the humidification fluid injecting means 40 is attached a steam trap 45 for discharging condensate automatically outside the system, said condensate arises from the condensation of humidification steam supplied from the steam pipe 42. The air at predetermined humidity is prepared by supplying steam from the steam pipe 42 to the air at predetermined temperature which flows through the interior of the mixing part 41.

Supplying water by means of the humidification fluid injecting means 40 to control the humidity of the flowing air can be also performed by the constitution similar to the present embodiment. That is to say, the humidity of said air is controlled by spraying water into the flowing air from a number of blow-off holes of the distal end pipe 44.

A second auxiliary heat exchanger 46 is disposed at the downstream side of the humidification fluid injecting means 40. The auxiliary heat exchanger 46, while the air at a predetermined humidity flows therethrough, performs heat exchange between heat exchange fluid, which is supplied by way of the heat exchange fluid supply pipe 47 and regulating valve 48, and said air, to thereby regulate the humidity and temperature of said air to a humidity and temperature suitable for the fermentation tank 1. Normally, water having a normal temperature is used as a heat exchange fluid, and the air heated by the aerofin heater 39 and humidification fluid injecting means 40 is cooled to a predetermined temperature, to thereby provide an air having predetermined temperature and humidity.

In the case where humidity and temperature of the air introduced into the fermentation tank 1 can be made to a predetermined value by controlling a quantity of injection of the fluid introduced in the aerofin heater 39 and the humidification fluid injecting means 40, the second auxiliary heat exchanger 46 is not always necessary.

Between the second auxiliary heat exchanger 46 and the fermentation tank 1 are attached a gas-liquid separator 51, a humidity sensor 49, and a temperature sensor 50. The humidity sensor 49 and the temperature sensor 50 serve to detect humidity and temperature of the air supplied to the fermentation tank 1 from the air supply pipe 37. The humidity sensor 49 is electrically connected to the regulating valve 43 of the steam pipe 42 by way of a controller (not shown), and the temperature sensor 50 is electrically connected to the regulating valve 48 of the heat exchange fluid supply pipe 47 similarly by way of a controller (not shown), as required, correction of the humidity and temperature of the supplied air is performed.

Gas-liquid separator 51 serves to separate droplets or particle-like foreign matters containing in the air passed through the second auxiliary heat exchanger 46 and to pass only the air in a state of predetermined humidity to the downstream side. This gas-liquid separator 51 makes it possible to separate droplets or foreign matters by providing it with a porous filter, by giving a centrifugal force to the flowing fluid, by causing the flowing fluid to collide with the inner wall or by causing the flowing fluid to change.

In the case where fermentation treatment is performed in the air ambient atmosphere utilizing aerobic fermentation bacteria, fermentation treatment is performed by supplying air from the air supply part 36 into the fermentation tank 1, while in the case where fermentation is performed using anaerobic fermentation bacteria, it is necessary to exhaust the air therefrom and to perform the treatment; so, some change is made in the course of fluid, the air supply part 36 or the humidification fluid injecting means 40 is cut off from the second heat exchanger 46 and a predetermined gas other than air is directly supplied to the air supply pipe 37 to perform fermentation treatment.

In the case where the waste within the fermentation tank 1 can be heated directly with steam, fermentation treatment can be performed by supplying the steam, reduced to a predetermined pressure lower than an atmospheric pressure, directly into the fermentation tank 1, however, in the case where the waste cannot be heated directly with steam, fermentation treatment of the waste is performed by supplying reduced steam only to the jacket 2 enclosing the fermentation tank 1 or to the agitating wing 7 disposed in the interior.

At the time of fermentation treatment, waste is thrown from the casting inlet 5 only by a predetermined quantity into the fermentation tank 1. The percentage of water content of the cast waste is detected by a sensor of water content percentage (not shown) and if the water content percentage exceeds the percentage of water content suitable to start the fermentation treatment normally by 40–60% or so, it is desirable to perform previous drying before performing fermentation treatment. That is to say, steam above an atmospheric pressure and above 100° C. is supplied to the jacket part 2 from the reducing valve 18 of the steam supply pipe 3, a large quantity of water content containing in the waste is heated with steam having a high temperature, and the steam evaporated from the waste is absorbed from the gas suction opening 9 by the ejector 25, so that the water content percentage suitable for fermentation treatment can be obtained. Steam derived of heat by the waste in the jacket part 2 is condensed into condensate, which passes through the steam trap 28 and is absorbed into the ejector 25 of the combination pump mechanism 4 and leads to the tank 16.

When the water content percentage of the waste reaches a range of a value suitable for fermentation treatment, communication of the gas absorbing opening 9 with the ejector 25 is cut off and, simultaneously, supply of high temperature steam from the reducing valve 18 is stopped, instead reduced steam lower than an atmospheric pressure having a temperature of 40° C. to 70° C. suitable for fermentation is supplied from the reducing valve 17 to thereby perform fermentation treatment. As already described, the relation between pressure and temperature of steam is clearly determined, i.e., by making the steam pressure at 360 mm Hg (400 mm Hg lower than the normal pressure), steam having a temperature of approximately 80° C. can be obtained, further, by making the steam pressure at 60 mm Hg, steam having a temperature of approximately 40° C. can be obtained. As steam becomes condensate, it radiates condensation heat, so, heat capacity per flow reaches approximately 6 times to 12 times the hot water to same degree, and accordingly, the object to be treated with fermentation can be heated promptly with a large quantity of heat. Since steam can prevail even to the portions in the complicated shape, in the case where steam can be supplied directly to waste, the whole waste is uniformly heated so that irregularity of heating can be suppressed.

In the case where fermentation treatment is performed, preferably a degree of reduction in pressure of the combination pump mechanism 4 is slightly lower than the supplied steam pressure, and cooling water is supplied from the pipe part 15 to the tank 16 to thereby regulate the absorbing force of the ejector 25.

In the case where fermentation treatment is performed in the air ambient atmosphere using aerobic bacteria, the air supplied into the fermentation tank 1 reaches a predetermined state of humidity by humidification steam from the humidification fluid injection means 40, so, fermentation treatment within the fermentation tank 1 can be performed efficiently. In order to allow the air at predetermined humidity to be supplied into the fermentation tank 1, the waste within the fermentation tank 1 can be prevented from reaching into a partially over dried condition.

The fermentation gas (methane gas) produced within the fermentation tank 1 and the evaporated steam produced by heating is recovered from the circulating line 31 into the tank 16 by opening the water content absorbing pipe 10 which has been cut off, or is discharged to a place of treatment (not shown) by opening the fermentation gas recovery pipe 52.

The present embodiment shows an example in which the combination pump mechanism 4 as a vacuum pump is used, however, various kind of vacuum pumps such as a water sealed type vacuum pump or the like other than the illustrated combination pump mechanism 4 may be used. So, as an example, a device for feeding liquid under pressure which can be used in place of the combination pump mechanism will be described. This device uses pressurized fluid medium directly acting on the fluid to be absorbed is used.

Figure 2:
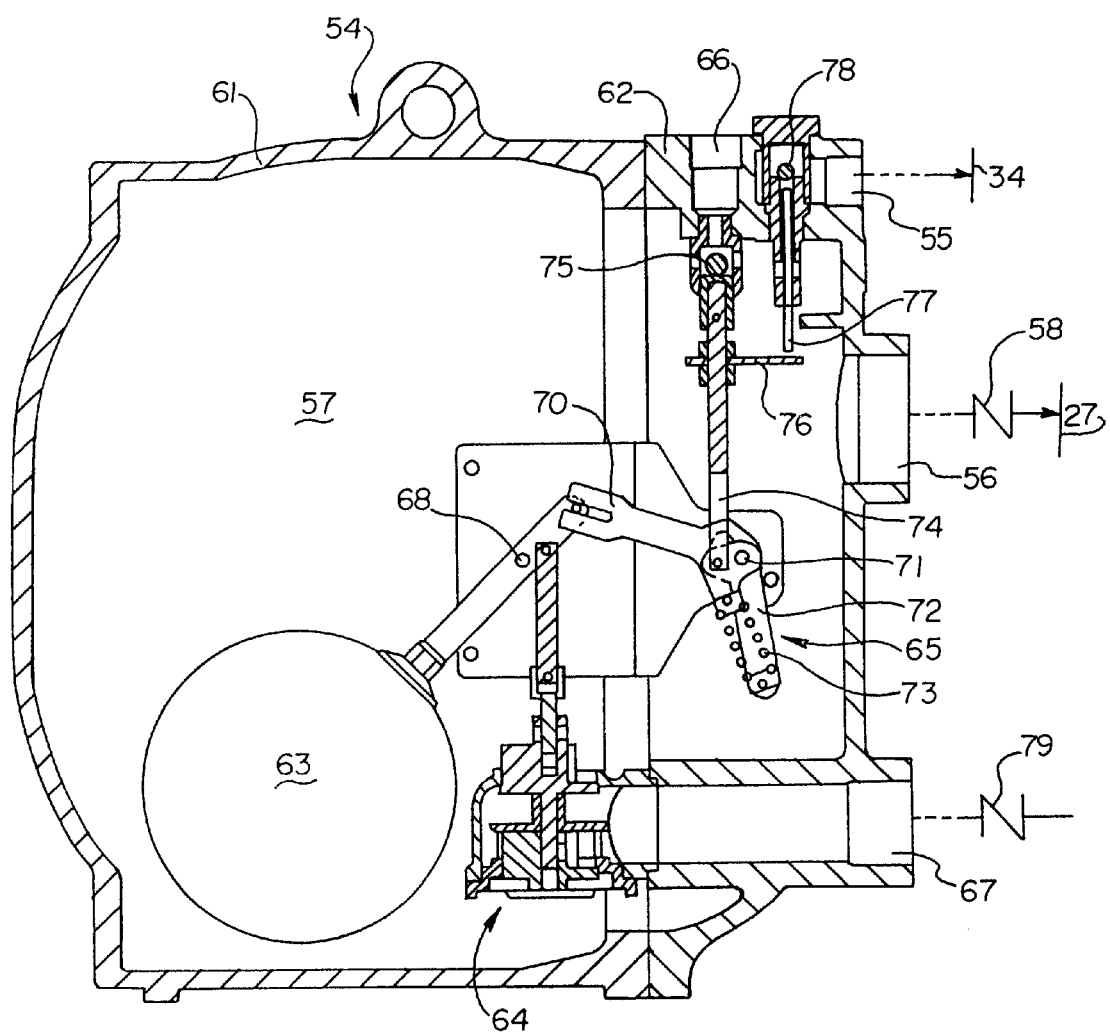
FIG. 2 is a sectional view of a device for feeding liquid under pressure used in place of a combination pump mechanism.

FIG. 2 shows a device 54 for feeding liquid under pressure, an operating steam inlet 55 of which is connected to a supply pipe 34 extending from a steam supply pipe 3 (not shown in FIG. 2). Furthermore, a condensate inlet 56 is connected to the jacket part 2 of the fermentation tank 1 by way of a communicating line 27, in which a check valve 58 which allows only flow of condensate in the direction of a closed vessel 57 is provided. Further, in the device 54 for feeding liquid under pressure, the closed vessel 57 is composed of a body 61 and a lid 62, and in the body, a float 63, a float valve 64 and a snap mechanism 65 are disposed, while on the lid 62, an operating steam introducing inlet 55, an operating steam discharging outlet 66, a condensate inlet 56 and condensate outlet 67 are provided.

The float 63 is pivotably moved about a support 68 to cause a float valve 64 of a double valve mechanism to be moved up and down, so that communication and cut-off of the condensate outlet 67 occur and, simultaneously, a first lever 70 is caused to be displaced up and down with the support 71 as a center. Similarly, a second lever 72 is disposed rotatably with the support 71 as a center, and a compression spring 73 in a compressed state is fitted between the end of the second lever 72 and the end of the first lever 70. An operating rod 74 is fitted to the upper portion of the second lever 72.

To the upper portion of the operating rod 74 is attached a spherical discharging valve body 75 which opens and closes the operating steam outlet 66 and, simultaneously, to the middle portion of the operating rod 74 is secured an operating lever 76. An operating steam introducing inlet rod 77 is disposed for up and down motion at the upper portion of the operating rod 76, and an operating steam introducing valve body 78 in the shape of a sphere is disposed in a free state further upwardly of the operating steam introducing inlet rod 77. The introducing valve body 78 opens the operating steam introducing opening 55 as the introducing opening rod 77 is displaced upwardly, to supply the operating steam into the closed vessel 57. In the state shown in FIG. 2, condensate within the closed vessel 57 is less and the float 63 is positioned below. In this state, the float valve 64 is closed to thereby cuts off the interior of the closed vessel 57 and condensate outlet 67. Incidentally, at the side of the jacket part 2 which is not shown from the check valve 58 in the communicating line 27, a water content absorbing pipe branches and a water supply pipe is connected, so, water is supplied into the jacket part 2 to thereby exhaust the air within said jacket part or to supply water into the device 54 for feeding liquid under pressure only at the initial time to drive forcibly the device 54 for feeding liquid under pressure.

When condensate flows into the closed vessel 57 from the condensate inlet 56 and the water level therein rises, the float 63 also rises and the float valve 64 is slightly opened downward. Furthermore, when the water level rises and the float 63 reaches a predetermined height, the snap mechanism 65 is moved in snap motion to thereby cause the operating rod 74 to be displaced upwardly. The upward displacement of the operating rod 74 causes the operating steam discharging valve body 75 to close the operating steam discharge opening 66 and, simultaneously, causes the introducing valve body 78 to open the operating steam introducing opening 55, so that operating steam at high pressure is supplied into the closed vessel 57 and the condensate which has been accumulated is fed under pressure by way of the float valve 64, condensate outlet 67 and check valve 79 to a predetermined place. The condensate is fed under pressure causing the water level to drop, and when the float 63 also drops and reaches a predetermined height, the snap mechanism 65 is moved again in snap motion in the opposite direction, to thereby close the operating steam introducing opening 55, open the operating steam discharge opening 66 and to also close the float valve 64, so that pressure feeding of condensate is stopped and, simultaneously, condensate flows again from the condensate inlet 56 into the closed vessel 57, thus the above-described cycle being repeated.

The above-described driving cycle of the device 54 for feeding liquid under pressure discharges the drain as initial condensed water within the jacket part 2 or exhausts the air from the water content absorbing pipe 10 (FIG. 1), so that the interior within jacket part 2 becomes gradually a state reduced in pressure lower than an atmospheric pressure.

Moreover, in the above-described two embodiments, an example in which a vacuum pump or a device for feeding liquid under pressure is used, however, if the interior of the jacket part 2 or the interior of the fermentation tank 1 is previously kept in a state of vacuum without using the above-described pump or device always, fermentation treatment can be performed at a temperature lower than 100° C. by supplying a predetermined reduced pressure steam.

Next, in order to perform more efficient fermentation treatment, a primary side heat treatment device for previously heating the waste, which is provided before the fermentation tank 1 for compost of organic waste, will be described.

Figure 3:
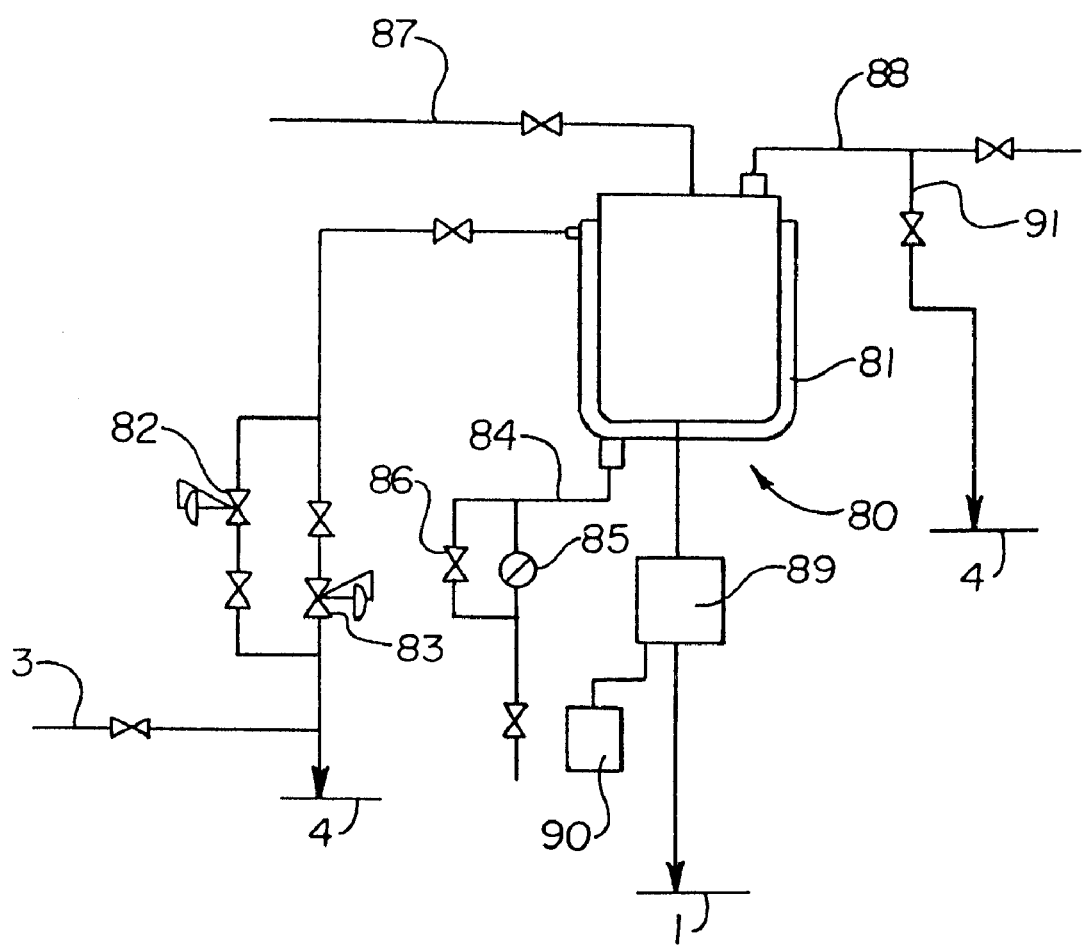
FIG. 3 is a schematic view showing a heat treatment device provided at the upstream side of the fermentation tank.

In this example, since the waste treated with heat within the primary side heat treatment device reaches the cast opening 5 of the already described fermentation tank 1 by way of a dehydrating device, and furthermore, since the steam for heating indirectly the primary side heat treatment device is supplied from the already described steam supply pipe 3, these relation is made clear in FIG. 3 and the detailed explanation will be omitted.

A fermentation treatment apparatus according to the present embodiment comprises a heat treatment device 80 which is also a primary fermentation tank, a fermentation tank 1 in which secondary fermentation is performed for compost, a vacuum pump (not shown), and a steam supply pipe 3 for supplying steam to the heat treatment device 80 and the fermentation tank 1.

A jacket part 81 which is a heat exchange part is provided substantially on the whole periphery of the heat treatment device 80. Said jacket part 81 is connected to the steam supply pipe 3, and on the line therebetween are provided reducing valves 82 and 83, which perform the function similar to that of the already described reduced valves 17 and 18. That is to say, if the set pressure of the reducing valve 82 is made from above an atmospheric pressure to a pressure of 2 or 3 $kg/cm^2$ or so, the initial waste containing a large quantity of water content cast into the heat treatment device 80 is heated to a state of high temperature higher than 100° C., whereby the excess initial water content can be removed in a short time. Moreover, interposition of the reducing valve 83 allows steam at a relatively high pressure supplied from a boiler to be reduced to a atmospheric pressure or so or a pressure lower than it, and such reduced steam is supplied to the jacket part 81. Also here, an example in which the reducing valves 82 and 83 are used to regulate the steam pressure, is shown, however, a valve other than the reducing valve, for example, an automatic regulating valve such as a pressure regulating valve or a temperature regulating valve or the like can be used, or in the case where the steam pressure of the boiler is low and stable, a ball valve or a needle valve or the like can be used as a throttle valve.

The jacket part 81 is provided at the bottom with a discharge pipe 84, which is further provided with a steam trap 85 and a valve 86, and said line further communicates with a circulating line 31 which is not shown in FIG. 3. Further, on the top of the heat treatment device 80 is provided a waste supply pipe 87 and a gas discharge pipe 88. The heat treatment device 80 is connected at the bottom to the cast opening 5 of the fermentation tank 1 by way of a dehydrating device 89. Furthermore, separately of connection to the fermentation tank 1, an intake tank 90 is connected to the dehydrating device 89. The dehydrating device 89 serves to extract water content within the waste fed to the fermentation tank 1 from the heat treatment device 80.

In the case of fermentation treatment, first, the waste from the waste supply pipe 87 is housed in the heat treatment device 80, and while the steam above an atmospheric pressure or a steam reduced lower than an atmospheric pressure is supplied from the steam supply pipe 3 to the jacket part 81 to thereby evaporate excess water content of the waste, a primary fermentation of the waste is performed. The evaporated water content passes through a pipe part 91 which branches from the gas discharge pipe 88 and leads to the auxiliary heat exchanger 11 (not shown in FIG. 3), in which it is condensed by heat exchange with cooling water and is fed to the tank 16 (similarly, not shown). Further, methane gas which generates in the heat treatment device 80 is discharged from the gas discharge pipe 88 to a place of treatment (not shown).

After completion of the primary fermentation, further predetermined water content is removed from the waste in a dehydrating device 89 and the dehydrated waste is cast into the fermentation tank 1. The steam, which gave a quantity of heat to the waste to perform heat treatment of the waste, is condensed into condensate, which is recovered to a tank (not shown) by way of the steam trap 85 from a discharge pipe 84 by means of a vacuum pump 84 (not shown).

Also heating of the waste in the heat treatment device 80 is made in the indirect heating type, however, depending on the kind of waste, steam can be directly supplied to the waste into the heat treatment device 80 to treat it with heat. Furthermore, similarly to the provision of the fermentation tank 1, the heat treatment device 80 may be provided with an agitating wing.

Figure 4:
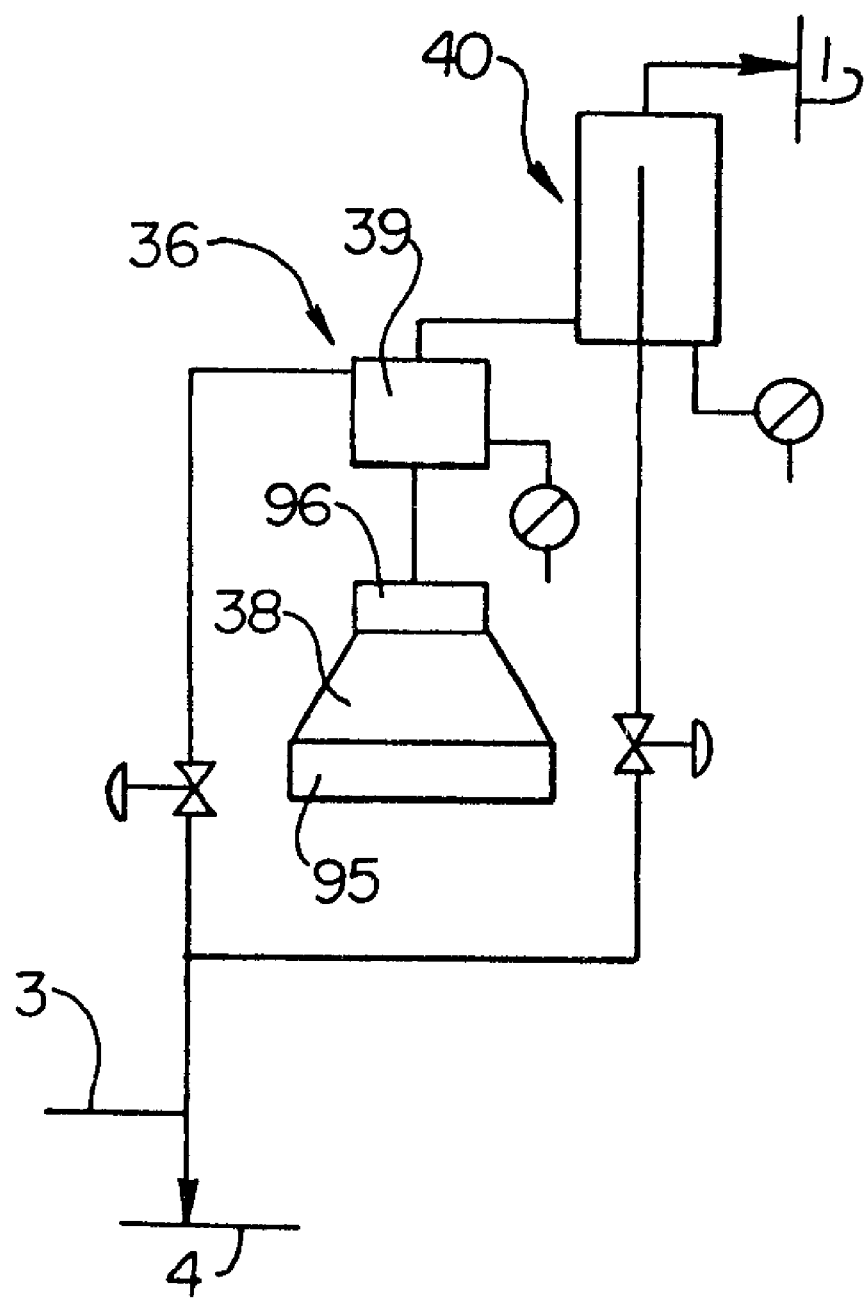
FIG. 4 is a schematic view of an air supply part provided with an oxygen enrichment means.

In order to make the concentration of oxygen of the air supplied to the fermentation tank 1 adjustable, the steam air supply part 36 may be provided with an oxygen humidification means. As shown in FIG. 4, the air supply part 36 comprises an oxygen enrichment means 95 made of zeolite for performing a first step of oxygen enrichment from the open air, an air fan 38 which absorbs and supplies a desired quantity of air, a second step of oxygen enrichment means 96, which consists of an oxygen enrichment membrane attached to the outlet side of the air fan 38, and an aerofin heater 39 which heats the air of predetermined concentration of oxygen fed from the air fan 38 to a certain temperature. The present embodiment shows an example in which the oxygen enrichment means 95 and 96 are disposed in two steps and in series, however, the oxygen enrichment means may be disposed in one step or in multiple steps more than two steps. In short, it may be provided in such a way that a desired concentration of oxygen, with which fermentation bacteria is activated within the fermentation tank 1, is obtained. Since the humidification fluid injecting means 40 is disposed at the downstream side of the acrofin heater 39, as already described, and the course of air flowing thereafter is explained with reference to FIG. 1, so such explanation is not repeated.

What is claimed is:

1. In a fermentation treatment apparatus of the type having a fermentation tank in which organic waste is housed, and a means for maintaining waste within said fermentation tank in a state suitable for fermentation treatment, the improvement in combination therewith comprising a gas which performs a gas-liquid change within a range of temperature suitable for fermentation is used as one of said maintaining means, and the waste is heated and maintained by the liquefaction of said gas.

2. A fermentation treatment apparatus as claimed in claim 1, wherein said gas comprises a steam vapor which is reduced in pressure.

3. A fermentation treatment apparatus as claimed in claim 1, further comprising a heat treatment device at a primary side of said fermentation tank, and a steam vapor having a pressure lower than an atmospheric is used as a heat source for maintaining said heat treatment device in a temperature suitable for heat treatment.

4. A fermentation treatment apparatus as claimed in claim 1, further comprising an absorbing means connected to a heat exchange part in which heat exchange is performed between said gas and waste.

5. A fermentation treatment apparatus as claimed in claim 1, further comprising a means for regulating the humidity of air supplied to waste, to a value suitable for fermentation treatment; and the humidity of the air, which flows through an air supply part provided for supply of air to said fermentation tank, is regulated by said means for regulating.

6. A fermentation treatment apparatus as claimed in claim 5, wherein said regulating means further comprises a means for injecting a humidification fluid and a means for detecting temperature attached to a fermentation tank side of said means for injecting humidification fluid, whereby a quantity of injection of fluid from said means for injecting humidification fluid is controlled depending on a value detected by said humidity detecting means.

7. A fermentation treatment apparatus as claimed in claim 5, wherein said air supply part further comprises means for oxygen enrichment.

* * * * *

UNITED STATES PATENT AND TRADEMARK OFFICE
CERTIFICATE OF CORRECTION

PATENT NO.    : 6,420,167 B1
DATED         : July 16, 2002
INVENTOR(S)   : Masakatsu Okamoto et al.

It is certified that error appears in the above-identified patent and that said Letters Patent is hereby corrected as shown below:

Column 12,
Line 30, please remove comma after "air supplied to waste".
Line 33, please remove comma after "tank".

Signed and Sealed this

Fourth Day of March, 2003

JAMES E. ROGAN
*Director of the United States Patent and Trademark Office*